(12) United States Patent
Schellenberger et al.

(10) Patent No.: US 10,152,363 B2
(45) Date of Patent: Dec. 11, 2018

(54) IDENTIFYING POTENTIAL COMPUTER SYSTEM PROBLEMS USING MACHINE LEARNING TECHNIQUES

(71) Applicant: Microsoft Technology Licensing, LLC, Redmond, WA (US)

(72) Inventors: Jan Schellenberger, Belmont, CA (US); Huiji Gao, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 15/071,629

(22) Filed: Mar. 16, 2016

(65) Prior Publication Data

US 2017/0269981 A1  Sep. 21, 2017

(51) Int. Cl.
*G06F 11/00* (2006.01)
*G06F 11/07* (2006.01)
*G06N 5/04* (2006.01)

(52) U.S. Cl.
CPC .......... *G06F 11/0769* (2013.01); *G06N 5/045* (2013.01)

(58) Field of Classification Search
USPC .......................................................... 714/26
See application file for complete search history.

(56) References Cited

U.S. PATENT DOCUMENTS

| | | | | |
|---|---|---|---|---|
| 2002/0174384 | A1* | 11/2002 | Graichen | G06F 11/008 714/37 |
| 2012/0030522 | A1* | 2/2012 | Yabuki | G06F 11/0754 714/47.1 |
| 2012/0151277 | A1* | 6/2012 | Jung | G06F 11/0709 714/47.3 |
| 2014/0365349 | A1* | 12/2014 | Kennon | G06Q 50/01 705/34 |
| 2015/0347217 | A1* | 12/2015 | Biem | G06N 5/046 714/37 |
| 2016/0147585 | A1* | 5/2016 | Konig | G06F 11/3419 714/37 |

* cited by examiner

*Primary Examiner* — Sarai E Butler
(74) *Attorney, Agent, or Firm* — Hickman Palermo Becker Bingham LLP; Daniel D. Ledesma

(57) ABSTRACT

A system and method for determining whether a computer system is experiencing a problem are provided. Multiple data sets are identified. Each data set includes multiple values indicating a set of attributes that relate to a computer system and that correspond to a different time period of multiple time periods, such as days or hours. A model is generated based on the multiple data sets. A particular data set is identified that includes a set of values that correspond to the set of attributes and a particular time period that is subsequent to each of the multiple time periods. The model is used to generate a predicted value based on the particular data set. An actual value that corresponds to the particular time period is identified. A difference between the actual value and the predicted value is calculated and indicates a likelihood that the computer system is experiencing a problem.

21 Claims, 5 Drawing Sheets

| Date | Actual CTR | Predicted CTR | Error Measurement | Top Features |
|---|---|---|---|---|
| 2016-03-15 | 0.3679 | 0.363 | -1.33 | baseline : 0.4227<br>requests3000 : -0.0154<br>requests : -0.0153<br>requests2 : -0.0151<br>mobilepercent : -0.0104<br>day4 : -0.0042<br>day5 : -0.0021 |
| 2016-03-16 | 0.3928 | 0.3729 | -5.06 | baseline : 0.4224<br>requests2 : -0.0123<br>mobilepercent : -0.0121<br>requests : -0.0116<br>requests3000 : -0.0094<br>day4 : -0.0043<br>day5 : -0.0021 |
| 2016-03-17 | 0.3936 | 0.3771 | -4.2 | baseline : 0.4225<br>mobilepercent : -0.013<br>requests2 : -0.01<br>requests : -0.0098<br>requests3000 : -0.0067<br>day4 : -0.0044<br>day2 : -0.0024 |
| 2016-03-18 | 0.417 | 0.4024 | -3.5 | baseline : 0.4226<br>mobilepercent : -0.0146<br>day3 : -0.0057<br>requests3000 : 0.0053<br>day4 : -0.0044<br>day5 : -0.0023<br>requests2 : -0.0018 |
| 2016-03-19 | 0.5898 | 0.5321 | -9.79 | baseline : 0.4224<br>day4 : 0.027<br>requests2 : 0.0222<br>requests : 0.0206<br>requests3000 : 0.0204<br>mobilepercent : 0.0185<br>day5 : -0.0023 |

*FIG. 3B*

IDENTIFYING POTENTIAL COMPUTER SYSTEM PROBLEMS USING MACHINE LEARNING TECHNIQUES

TECHNICAL FIELD

The present disclosure relates to using machine learning techniques to determine whether a computer system is experiencing problems. SUGGESTED ART UNIT: 2121; SUGGESTED CLASSIFICATION: 706/18.

BACKGROUND

Performance of a typical computer system, regardless of what functions the computer system implements, may change regularly. Performance changes may be attributable to changes in workload, changes in configuration, software updates, etc. If performance of a computer system that performs many tasks and has many hardware or software components declines, then it may be difficult to not only identify the source of the problem, but also determine whether the problem is one that originates with the computer system or just a result of normal operating conditions. If it is presumed that the computer system is suffering from an internal problem that does not exist, then much valuable time and effort may be wasted searching for a solution.

BRIEF DESCRIPTION OF THE DRAWINGS

In the drawings:

FIG. 3B depicts an example table showing actual CTR, predicted CTR, and top features for multiple time periods, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for using machine learning techniques to determine a likelihood that a computer system is experiencing one or more problems. In one technique, a statistical model is generated based on multiple data sets, each corresponding to multiple features related to the computer system and to a different time period. The statistical model is used to generate a predicted value of a target metric corresponding to a particular time period, such as the current or most recent day. The predicted value is later compared with an actual (known or non-predicted) value of the target metric. The difference between the two values indicates whether the computer system is experiencing a problem. For example, if there is no difference between the two values, then the likelihood that the computer system is experiencing a problem is relatively low.

Process Overview

Figure 1:
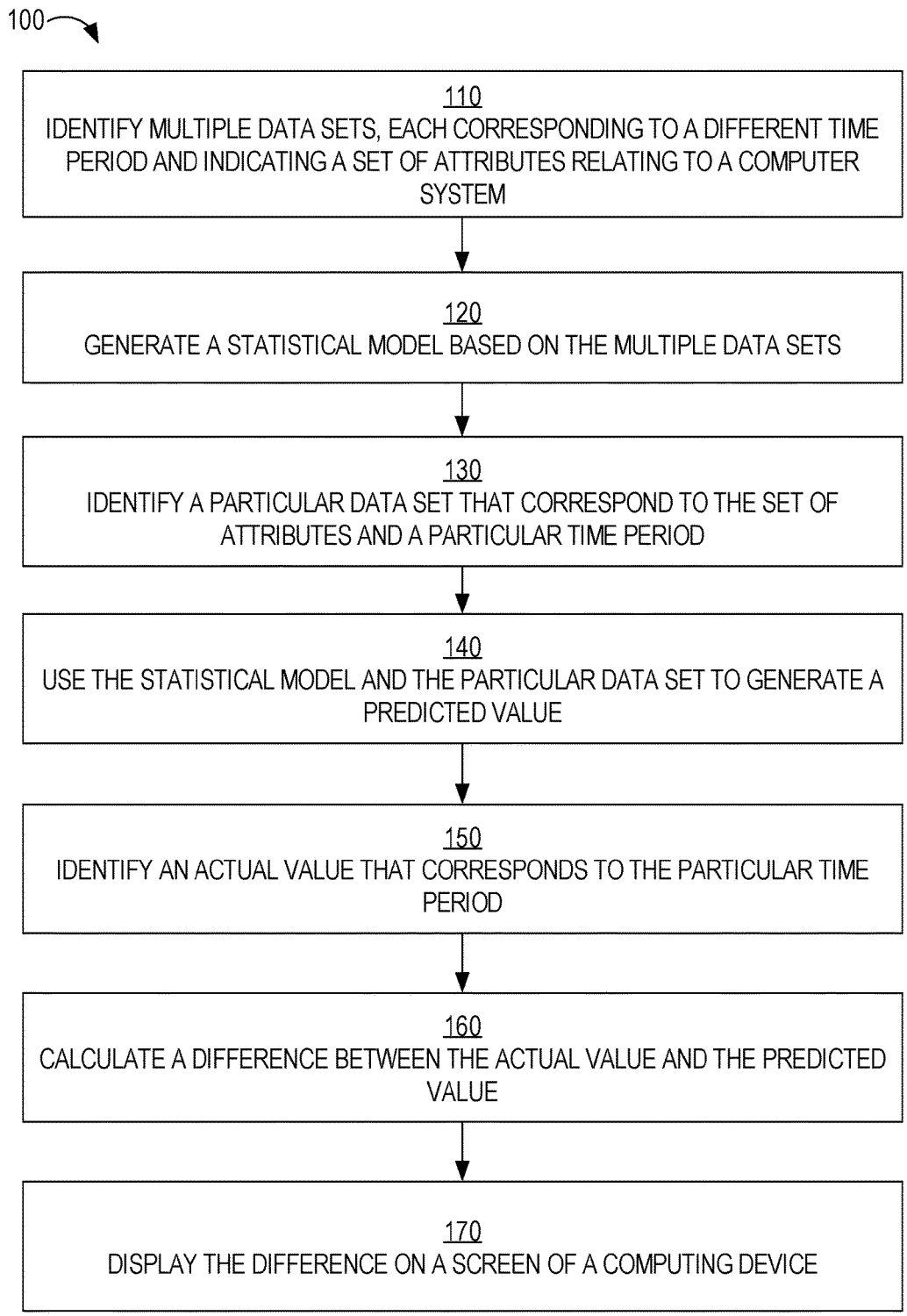
FIG. 1 is a block diagram that depicts a process for determining a likelihood that a computer system is experiencing a problem, in an embodiment.

FIG. 1 is a block diagram that depicts a process 100 for determining a likelihood that a computer system is experiencing a problem, in an embodiment. Process 100 may be performed by one or more components of the computer system or one or more components of another (e.g., affiliated) computer system.

At block 110, multiple data sets are identified. Each data set includes multiple values indicating a set of attributes that relate to the computer system and that correspond to a different time period of multiple time periods. Example lengths of the time periods include a week, a day, 12 hours, and one hour.

At block 120, a statistical model is generated based on the multiple data sets using one or more machine learning techniques, such as linear regression.

At block 130, a particular data set that includes a set of values that correspond to the set of attributes and a particular time period is identified. The particular time period may be the same length of time as the time periods associated with the multiple data sets. The particular time period is subsequent to each of the multiple time periods. For example, the particular time period may be the current day or the most recent day, for which a full data set is available.

At block 140, the statistical model is used to generate, based on the particular data set, a predicted value. For example, the predicted value corresponds to a prediction of what will be detected during the particular time period, such as the current day or a previous day, using other known (detected) values.

At block 150, an actual value that corresponds to the particular time period is identified. For example, the actual value corresponds to what was actually detected during the particular time period, such as the current day or a previous day.

At block 160, a difference between the actual value and the predicted value is calculated. The difference may be an absolute difference or a statistically significant difference. The difference indicates a likelihood that the computer system is experiencing a problem.

At block 170, the difference is displayed on a screen of a computing device. If another computing device initiated process 100, that the other computing device may be the same as or different than the computer device having the screen upon which the difference is displayed.

Computer System

The computer system whose performance is being predicted may be any type of computing system. The computer system may comprise a single computing device or may comprise multiple computing devices that are communicatively coupled on the same network (or subnet) or are distributed locally or globally across different networks.

Figure 2:
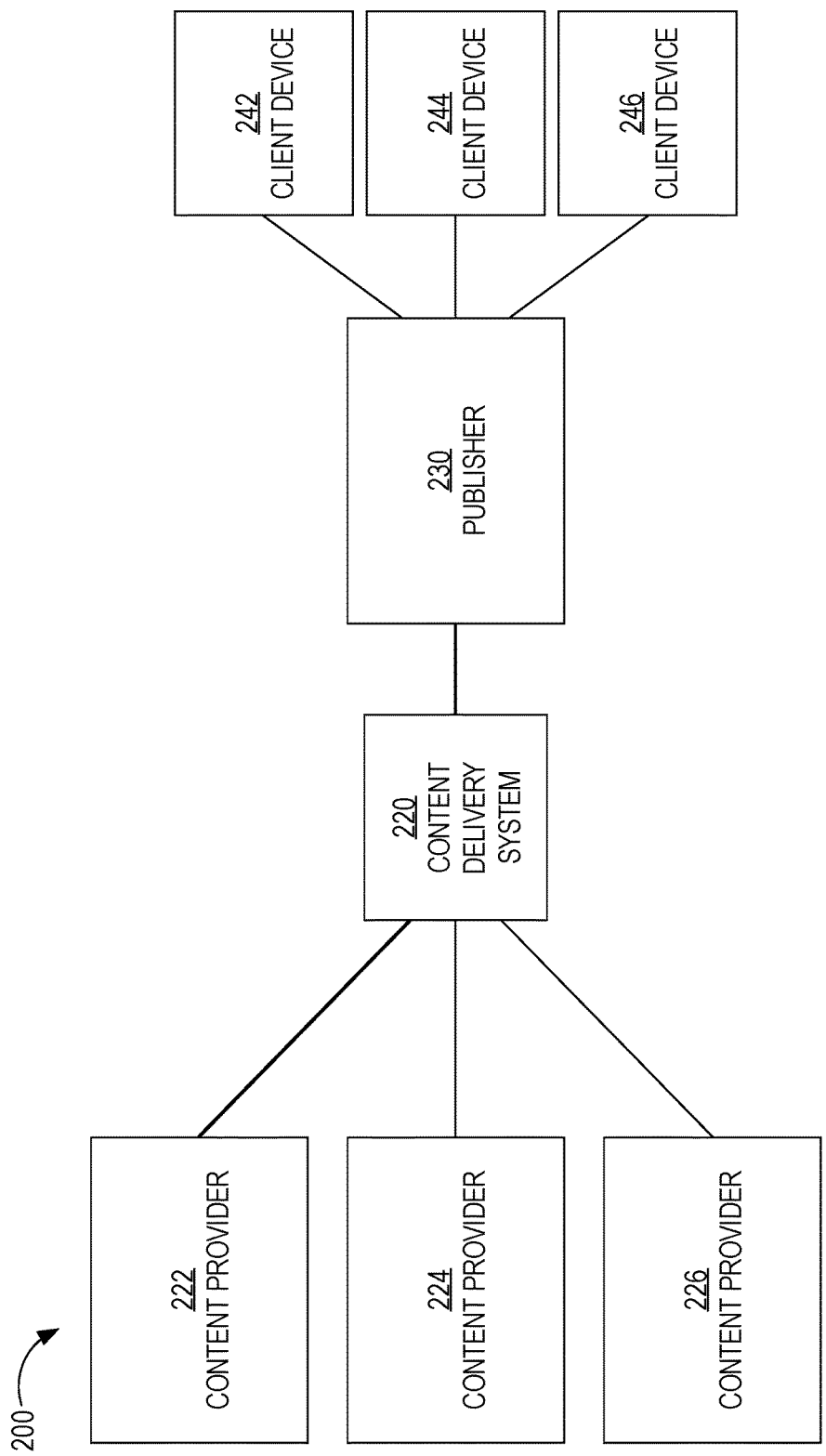
FIG. 2 is a block diagram that depicts a system for distributing content items through a publisher to one or more end-users, in an embodiment.

In an embodiment, the computer system is a content delivery system. FIG. 2 is a block diagram that depicts a system 200 for distributing content items through a publisher to one or more end-users, in an embodiment. System 200 includes content providers 212-116, a content delivery system 220, a publisher 230, and client devices 242-246. Although three content providers are depicted, system 200 may include more or less content providers. Similarly, system 200 may include more than one publisher and more or less client devices.

Content providers 212-216 interact with content delivery system 220 (e.g., over a network, such as a LAN, WAN, or the Internet) to enable content items to be presented, though publisher 230, to end-users operating client devices 242-246. Thus, content providers 212-216 provide content items to content delivery system 220, which in turn selects content items to provide to publisher 230 for presentation to users of client devices 242-246. However, at the time that content provider 212 registers with content delivery system 220, neither party may know which end-users or client devices will receive content items from content provider 212, unless a target audience specified by content provider 212 is small enough. In a related embodiment, content delivery system 220 sends content items to client devices 242-246 directly, i.e., not through a (e.g., third party) publisher, such as publisher 230.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 220.

Publisher 230 provides its own content to client devices 242-246 in response to requests initiated by users of client devices 242-246. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 230 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 230 provides the requested content (e.g., a web page) to the client device.

Simultaneously or immediately before or after the requested content is sent to a client device, a content request is sent to content delivery system 220. That request is sent (over a network, such as a LAN, WAN, or the Internet) by publisher 230 or by the client device that requested the original content from publisher 230. For example, a web page that the client device renders includes one or more calls (or HTTP requests) to content delivery system 220 for one or more content items. In response, content delivery system 220 provides (over a network, such as a LAN, WAN, or the Internet) one or more particular content items to the client device directly or through publisher 230. In this way, the one or more particular content items may be presented (e.g., displayed) concurrently with the content requested by the client device from publisher 230.

A content item may comprise an image, a video, audio, text, graphics, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 242-246 include desktop computers, laptop computers, tablet computers, wearable devices, video game consoles, and smartphones.

In an embodiment, the computer system manages content distribution campaigns on behalf of (e.g., third-party) content providers, such as advertisers. A content distribution campaign is a campaign to distribute content (e.g., advertisements) to one or more users. The identities of the one or more users may be pre-defined or known at the time the content distribution campaign begins. Alternatively, as alluded to previously, the identities are not known at the time the content distribution campaign begins. For example, a content distribution campaign specifies one or more criteria that must be satisfied before sending one or more content items to a particular user operating a computing device. The one or more criteria may indicate a time of day or day of the week, one or more attributes of the computing device, and/or one or more attributes of the particular user.

A provider (or creator) of a content distribution campaign (referred to herein as a "campaign provider") may be different than a distributor of the content distribution campaign (referred to herein as a "campaign distributor") that is responsible for distributing content items (associated with the content distribution) campaign over a computer network (e.g., the Internet) to one or more users. A campaign distributor may coordinate with a third-party content provider to present content items associated with one or more content distribution campaigns (that the campaign distributor manages) to users who visit a website of the third-party content provider or use an application developed by (or owned by) the third-party content provider.

Machine Learning

In an embodiment, a predicted value is generated using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with a computer system (e.g., content delivery system 220). The statistical model is trained based on multiple attributes described herein. In machine learning parlance, such attributes are referred to as "features." To generate and train a statistical model, a set of features is specified and a set of training data is identified.

Embodiments are not limited to any particular machine learning technique for generating a statistical model. Example machine learning techniques include linear regression, logistic regression, and random forests.

In an embodiment, generating a statistical model involves applying regularization. Regularization refers to a process of introducing additional information into a statistical model in order to prevent overfitting.

Example Features

Each statistical model is based on a set of features that relate to the computer system. Each feature described herein may be tracked at one or more levels of time granularity, such as per day, per 12 hours, per hour, and/or per minute.

An example feature upon which the statistical model is based is a number of requests that the computer system (e.g., content delivery system 220) receives or processes. Examples of request-related features include a total number of requests (that the computer system received), a number of requests per channel type (e.g., smartphone, desktop computer, tablet computer), a percentage of requests from one channel type (e.g., mobile), and a number of requests per geographic area (e.g., North America, China, Middle East). Thus, if two channels are tracked and five geographic areas are tracked, then there may be at least seven features related to requests. Total number of requests and number of requests per channel (and/or number of requests per geographic area) may both be tracked and used as features to train the statistical model. Thus, there may be overlap in the training data pertaining to two or more features.

In order to determine a channel type, the computer system analyzes a request, which may indicate a make and model of the computing device that submitted the request. The make and/or model may be mapped to a particular channel type, such as mobile, desktop, laptop, or tablet.

In order to determine a geographic area, the computer system may identify a source IP address in a content request and determine, based on at least a portion of the IP address, from which country or region the content request originates. Additionally or alternatively, the computer system may identify a geographic area based on information associated with the user that is operating the computing device that submitted the content request. In this scenario, the content request includes a user or member identifier that the computer system (or an affiliated computer system) uses to identify a corresponding user profile that includes such geographic information.

Another type of feature upon which the statistical model may be based is a number of content distribution campaigns. Examples of campaign-related features include a total number of content distribution campaigns, a number of campaigns per cost type (e.g., CPM, CPC, CPA, each of which is described in more detail herein), a number of campaigns per cost type and above one or more particular bid amounts (e.g., $2, $3, and 5$), and a number of campaigns with budgets greater than one or more particular amounts (e.g., $1000, $3000, and $6000). Thus, if there are three cost types, two bid thresholds, and three budget thresholds, then there may be at least eight features related to campaigns. Each of these example features may be tracked and used as features to train one or more statistical models.

Budgets and bid amounts of some content distribution campaigns may be denominated in different currencies; for example, some in US dollars and some in Chinese yuan. In an embodiment, in order to calculate a number of campaigns with certain budgets and/or with certain bid amounts, such budgets and/or bid amounts are first converted from one currency to another, such as from the euros to US dollars. In this way, if number of campaigns with budgets above a certain amount or with bid amounts above a certain amount is a feature, then that number may be accurately determined. A single exchange rate may be used in the conversion, regardless of the time period. Alternatively, an exchange rate may be determined for each specific day, week, or other time period before feature(s) for that time period is/are determined. For example, an exchange rate for December 1 is used when converting euros to US dollars in order to determine a number of campaigns (on that day) with bid amounts greater than $3 and a (different) exchange rate for December 2 is used when converting euros to US dollars in order to determine a number of campaigns (on that day) with bid amounts greater than $3.

A content distribution campaign with a cost type of CPM (referred to as "cost per impression") is a campaign where the campaign (or content) distributer receives, from the campaign (or content) provider, remuneration based on number of impressions of content items to end-users. Thus, a campaign provider compensates the campaign distributor (associated with the computer system) each time the campaign distributor causes a content item (associated with the campaign from the campaign provider) to be displayed to a user.

A content distribution campaign with a cost type of CPC (referred to as "cost per click") is a campaign where the campaign (or content) distributer receives, from the campaign (or content) provider, remuneration based on a number of times users select one or more content items. Thus, a campaign provider compensates the campaign distributor (associated with the computer system) each time an end-user selects a content item (associated with the campaign from the campaign provider) that the campaign distributor causes to be displayed to the end-user.

A content distribution campaign with a cost type of CPA (referred to as "cost per action") is a campaign where the campaign (or content) distributer receives, from the campaign (or content) provider, remuneration based on a number of specified actions that end-users perform relative the campaign. Thus, a campaign provider compensates the campaign distributor (associated with the computer system) each time an end-user performs a particular action (e.g., signs up for a newsletter or purchases a product) that the campaign provider is intending end-users to perform. The action may be tied to the user first selecting (or "clicking on") a content item (which may include a hyperlink), such that the user must perform some action after arriving at a website associated with the content item.

Another example of a request-related feature is a number of requests per user group, where each user group corresponds to a different set of one or more criteria that a user's known attribute(s) must satisfy (at least partially) in order to be associated with the user group. For example, a user group may be users who are in the tech industry and located in the United States. As another example, a user group may be CEOs in Europe who have over 500 connections in a social network. The known attributes may be retrieved from a social network provider that provides a social network service that allows users to create profiles and establish virtual connections with each other. Examples of social network providers include LinkedIn, Facebook, and Google+.

A user profiles may contain any information about a user that the user decides to include, such as a name, job title, job industry, employment status, email address, phone number, academic history and credentials, former employers/solo endeavors, work summary, skills, and personal hobbies and interests. A profile of a user may also include endorsements and skills that are specified by other users, such as connections of the user. A profile may associate each data item that the user inputs in an input (e.g., text) field with a field name or attribute name. Such an association enables proper presentation of a user's profile to viewers of the profile and easy retrieval and analysis for the social network service to perform.

A profile may also include connection information, such as a number of connections (in a social network), who those connections are, a number of sent invitations to connect, a number of received invitations to connection, a number of sent invitations to connect that were denied or accepted, a number of received invitations to connect that the user denied or accepted, etc.

Some data within a user profile may be derived based on analysis of the user's online activity, such as number of profile page views, number of company page views, number of blog postings, number of comments on blog postings, number of "likes" of blog postings, number of searches initiated overall, number of people searches and/or company searches initiated, and number of messages sent and/or received.

While the foregoing examples of connection information and online activity include one dimensional values, such information may additionally or alternatively include frequency or values over the last X units of time, such as the last 30 days. For example, connection information may include a number of (online social) connections that a particular user made in the last 30 days.

In addition to or instead of including number of requests per user group as features of a statistical model, content distribution campaigns may be tracked per user group or per target segment. A campaign's target segment refers to an intended audience of the content distribution campaign. For example, a particular content distribution campaign may target women who attended Stanford University and who are currently employed in the tech industry. If a user that initiates a request (e.g., transmitted by publisher 230) satisfies the four criteria, then that campaign is a candidate campaign (from which a content item may be selected) for that request. Thus, if there is a feature for a number of campaigns per day that target people over 30, then the particular content distribution campaign would be counted in that total.

Other example features include specific day of the week (e.g., Tuesday), week day v. weekend, whether a certain day is a national/regional holiday (e.g., US v. Chinese v. French), number of request by hour of the day, number of requests by data center (if computer system comprises multiple data centers), features related to content of a campaign (e.g., title/description/comments of advertisements), and features related to user interactions with content of a campaign (e.g., commenting, liking, sharing, and/or following content items of the campaign).

Time Periods

In an embodiment, each data set in a training data set corresponds to a different time period. For example, each data set corresponds to a different day in the past or a different hour in the past. The number of time periods may be pre-defined or may be tunable. For example, a user may cause a first statistical model to be trained based on training data corresponding to the previous 30 days and then, after providing input that indicates 60 days, cause a second statistical model to be trained based on training data corresponding to the previous 60 days.

User Interaction

In an embodiment, a level of user interaction is the target metric that is predicted using techniques described herein. An example of a level of user interaction is click through rate (CTR), which refers to how often users of a website (or who visit a particular set of one or more webpages of a website) click on, view, or otherwise select a content item. A content item is a digital item that comprises text, graphics, one or more images, audio, video, or any combination thereof.

For example, a user provides input to an application (e.g., web browser) executing on the user's computing device and the application, in response to receiving the input, issues a request for content that includes a video. The video automatically plays within the application and the user may view or consume a portion (or all) of the video. Viewing a content item may be considered as equally important to selecting the content item. Alternatively, viewing a content item and selecting a content item are tracked individually and treated differently.

Thus, for each data set in a training set, not only does the data set include values corresponding to the features and to a particular time period (e.g., Jan. 12, 2016), the data set corresponds to a particular level or amount of user interaction, such as CTR. Some of the aforementioned features may be highly correlated with CTR. For example, the more campaigns with higher bids, the higher the quality of the content, which translates into a higher level of user interaction. As another example, a greater percentage of requests that originate from mobile devices end up resulting in user selections versus requests that originate from desktops or tablet computers. Thus, the higher the number of requests that originate from mobile devices, the higher the number of user selections or the higher the CTR.

For example, part of the training set includes, for each time period (e.g., a day), in addition to request-related features and campaign-related features, a CTR. A CTR for a single time period may be calculated by determining a first number of content items that were selected by users during that time period, determining a second number of content items that were displayed to users during that time period (which number may include users that did not select any content items that were displayed to them), and dividing the first number by the second number.

Generation of a statistical model may be initiated automatically or manually, i.e., based on user input. For example, a statistical model may be automatically generated for each time period based on a schedule in order to generate a predicted value for that time period. As another example, an automatic comparison between an actual value of a target metric and a particular threshold may trigger generating of the statistical model if the actual value is, for example, below the particular threshold (e.g., actual CTR<0.30).

Multiple Statistical Models

In an embodiment, multiple statistical models are generated, one for each time period for the last X time periods, such as the last 30 days. Thus, each statistical model corresponds to a different period of time (although for the same length of time) and is generated based on a different subset of the training data. For example, a first statistical model is generated based on training data from November 1 to November 30, where the first statistical model is used to generate a prediction for December 1. A second statistical model is generated based on training data from November 2 to December 1, where the second statistical model is used to generate a prediction for December 2. Then, both predictions may be displayed continuously.

In a related embodiment, an error is calculated for each statistical model. The error may be expressed in any unit. An example error is a difference between the predicted value (e.g., of CTR) and the actual value. As another example, a percentage error is calculated by dividing the difference by the actual value. If an error is calculated for one statistical model, then a separate error may be calculated for each of multiple statistical models and combined or aggregated in some fashion. For example, the average (or mean) of the absolute errors may be calculated. Such an aggregated error reflects how accurate the statistical models are over a period of time.

Similar to a single statistical model, multiple statistical models may be generated based on a single instance of input, such as a user input comprising a user selection of a graphical button. Alternatively, a software program may be configured to automatically trigger generation of the multiple statistical models, for example, on a regular basis or in response to detecting of certain conditions, such as the current actual value of a target metric being below a particular threshold.

Example Graph

Figure 3A:
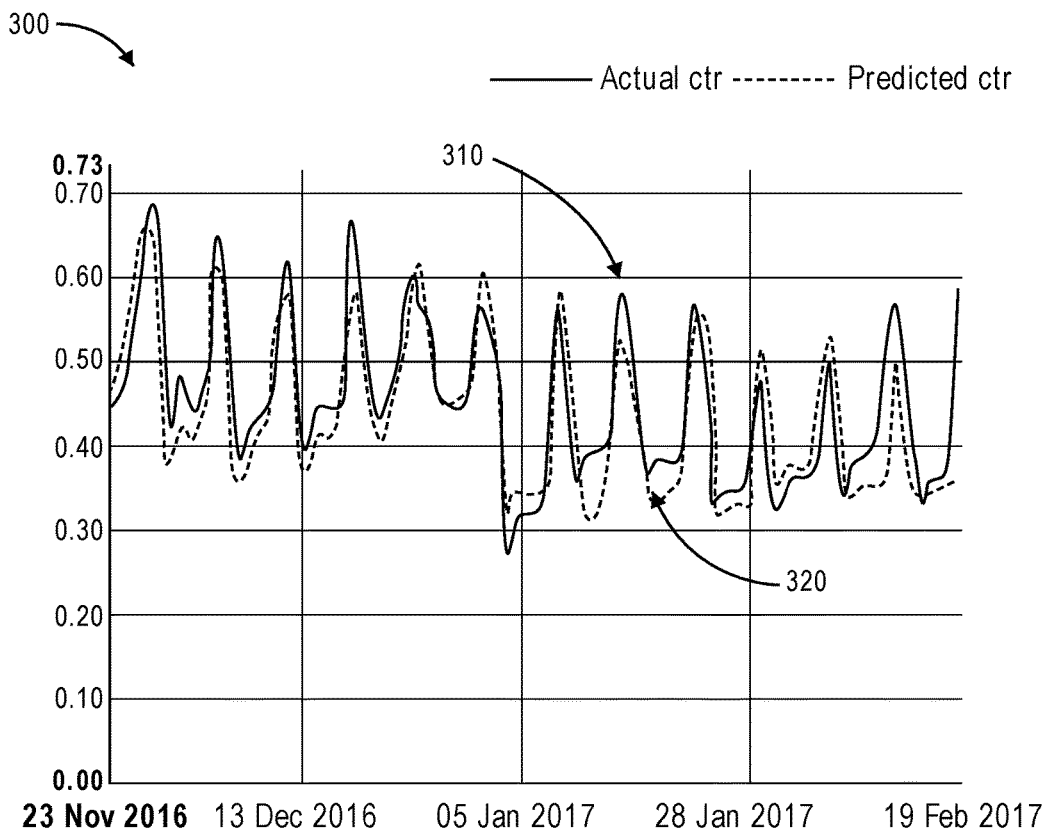
FIG. 3A depicts an example graph showing actual CTR and predicted CTR over a period of time, in an embodiment.

In an embodiment, information about predicted values and actual values is presented in graph form. FIG. 3A depicts an example graph 300 showing actual CTR and predicted CTR over multiple months, in an embodiment. Graph 300 includes (1) line 310 indicating actual CTR each day over three months and (2) line 320 indicating predicted CTR each day over approximately two months. Line 310 is created by connecting each actual CTR data point (correspond to a particular day) to the immediately subsequent actual CTR data point. Similarly, line 320 is created by connecting each predicted CTR data point (corresponding to a particular day) to the immediately subsequent predicted CTR data point. The respective lines allow an end user to visualize the changes in actual CTR and predicted CTR over time as well as the changing differences between actual CTR and predicted CTR over time, which changes may reveal cycles of over predicting and under predicting.

Graph 300 may be an interactive graph such that, when a user provides input that selects a point on the graph, data about the actual CTR and/or predicted CTR is displayed. For example, if a cursor of a mouse hovers over day February 7 (e.g., on locations other than one of lines 310-320, such as the x-axis), then the actual CTR and/or the predicted CTR for that day is displayed. As another example, if a user selects a point on line 310, then only the actual CTR for the day that corresponds to that point is displayed, without displaying the predicted CTR. Alternatively, both values are displayed concurrently FIG. 3A also depicts error data 330 that indicates a calculated error of the predicted CTR. The calculated error may be for a single time period (e.g., the most recent day) or may be for multiple time periods, such as the entire time period that graph 300 covers. In this example, the entire time period is 30 days. Example error measurements include root-mean-square (RMS) error and mean error. For example, an absolute error is calculated for each day (e.g., absolute value of actual CTR minus predicted CTR) and then divided by the total number of days in the training set.

A calculated error for the entire time period indicates how accurate the corresponding statistical models are as a group. Thus, if the calculated error is relatively high even though the predicted CTR may be identical to the actual CTR for the latest day, then the predicted CTR may not be trusted or given much credence. If a calculated error is above some threshold (e.g., 9), then error data 330 may be highlighted with extra text, different font type/size/color, graphics, and/or audio.

FIG. 3A also depicts options 340 that allow a user (viewing graph 300) to manually select (or deselect) one or more "variable groups," where each group refers to a group of related features. Example variable groups include number of campaigns by cost type, number of campaigns by bid amounts, number of campaigns by budget, day of the week, and number of requests by channel type. Each of these groups may comprise two or more features Additionally or alternatively, options 340 allow the user to select (or deselect) individual features, such as total number of requests, number of requests from mobile devices, and number of campaigns with budgets greater than a particular amount.

Once a user has selected or deselected one or more individual features and/or one or more variable groups, the user may provide input (e.g., selecting a submit button that may be adjacent to graph 300) that causes one or more additional statistical models to be generated based on the selected features and/or variable groups and training data that corresponds to those features. Such a process involves reading the portion of the training set that corresponds to the selected features and not taking into account values pertaining to the unselected or deselected features. Also, graph 300 may be automatically replaced with a new graph that is based on the one or more additional statistical models.

In an embodiment, a user interface allows a user to change the time period for which a prediction is made. For example, a user may select "day," "hour," or "minute" as the time period. The user interface may display such an option concurrently with a graph, such as graph 300. In this way, a user is allowed to see more granular information and create one or more graphs with differing time periods "on the fly." However, if the amount of training data is sparse at low levels of granularity (e.g., per minute), then any resulting statistical models may have relatively high error rates.

In an embodiment, a user interface allows a user to change the number of days of training data upon which one or more statistical models will be generated. For example, a user may specify the number of days manually in a text field, with a slider, or with another graphical interface object. While each statistical model that is used to generate graph 300 may be based on the prior 21 days, a user may specify 40 days or some other positive number, as long as training data exists for those days. The user interface may display such an option concurrently with a graph, such as graph 300.

Influential Features

FIG. 3B depicts a table 360 containing data that is reflected in graph 300 but in table form, including date information, actual CTR and predicted CTR for each relevant date, and an error measurement. The error measurement is calculated by dividing (1) the difference between the predicted CTR (in the third column) and the actual CTR (in the second column) by (2) the actual CTR.

Table 360 also includes top feature data that indicates, for each relevant date, which features had the largest influence on the predicted CTR on that date. Thus, the top feature data may point to the most important drivers of a prediction. As table 360 illustrates, the top feature data may change from day to day.

In table 360, the multiple features are ordered based on the magnitude of their respective influence. A measure of influence of a feature may be a product of two inputs: (1) an importance of the feature to the corresponding statistical model (which may the weight from that statistical model) and (2) an importance of the feature on the particular day (which may be a difference between the actual feature value on that day and an average of the feature value over the last N days, where N days is the time corresponding to the training set upon which the statistical model was built). Although not depicted in table 360, the units of the measure influence may be translated into any type unit of the target metric, which, in this example, is level of user selection, such as CTR.

For example, the top feature data may indicate that decrease in CTR is largely driven by a decrease in the number of campaigns with bid amounts over a certain amount or a decrease in user activity from mobile devices. Thus, the top feature data may be used to explain the change in the target metric or used as a starting point for further investigations. "Baseline" refers to an average of the actual target metric over the training data set.

In an embodiment, a user viewing table 360 provides input that selects an influential factor, which selection causes additional information about the selected factor to be displayed. For example, selecting "requests" in the second row of table 360 may cause a graph to be displayed, where the graph shows a number of requests received from end-user computing devices each day over the last N days, where N may be the number of days of training data upon which the statistical model for Feb. 16, 2016 is based.

Multiple Target Metrics

In an embodiment, multiple related target metrics may be tracked and predicted. Example metrics (related to CTR) that may be tracked and predicted include CTR by channel type, such as CTR pertaining to smartphones, CTR pertaining to desktop computers, CTR pertaining to laptop computers, and CTR pertaining to tablet computers. Thus, training data would need to be collected for each of these target metrics.

An additional set of target metrics includes CTR by geographic area, such as a specific country (e.g., Germany), a set of countries (e.g., countries in the European Union or English-speaking countries), a continent (e.g., Africa), or any other politically-defined or arbitrarily-sized geographic area. In this way, more granular predictions may be made. Without these device-specific or geo-specific metrics, potential issues with the computer system may not be identified. Instead, a problem in, for example, South America, may be masked by normal behavior in the remainder of the world.

In a related embodiment, a target metric may be tracked and predicted along with multiple "sub" metrics, such as those described above. Thus, regardless of whether there is a big difference between actual CTR and predicted CTR globally, a user can provide input to view actual v. predicted CTR by region, by channel (or device type), or by another dimension for which training data is available.

Other Target Metrics

In an embodiment, target metrics other than level of user selection, such as CTR, are predicted. Examples of other metrics include cost per click (CPC) and revenue. These target metrics may be extremely volatile with weekly, monthly, quarterly, and annual trends. Similar to CTR, volatility may be due to campaign provider behavior, user behavior, or both. Campaign provider behavior corresponds to the demand side and tends to be dictated by end of month/quarter effects, while user behavior corresponds to the supply side and tends to be dictated by day of the week and holidays in different parts of the world.

CPC refers to an amount a content provider spends before an end-user selects, views, or otherwise interacts with a content item provided by the content provider. For example, if a content provider spends one hundred dollars on a content distribution campaign on a particular day and 50 users selected (or "clicked on") a content item from the campaign, then the CPC of that campaign on the particular day would be $2 per click.

Revenue refers to an amount that the content distributor earns from distributing or delivering content items pertaining to one or more content distribution campaigns initiated by one or more content providers.

At least some of the embodiments described herein related to CTR also relate to CPC and revenue. For example, if the features (upon which a statistical model is based) described herein are gathered and aggregated on a daily or hourly basis, then revenue and/or CPC is also determined on a daily or hourly basis. As another example, revenue may be tracked and predicted on a per geographic region basis, a per channel type basis, and/or another basis. As another example, a graph and data chart may be generated that shows predicted revenue and actual revenue over a period of time, one or more error rate measurements of the statistical model(s), and/or options to select or deselect features upon which future the statistical model(s) are based. As another example, the measure of influence of each feature considered to be a top feature for a particular time period may be translated into a click through rate for CTR, a cost per click (e.g., dollars per click) for CPC, or a particular currency (e.g., dollars) for revenue.

In a related embodiment, a graph (e.g., graph 300) includes an option to select between different target metrics. For example, a user may be allowed to select between CTR, CPC, and revenue and/or target metrics at finer granularity, such as revenue per geographic region and CPC per channel type.

Interpreting a Difference Between an Actual Value and a Predicted Value

A difference between an actual value of a target metric and a predicted value of the target metric may suggest a certain approach to be taken or none at all, depending on the type of target metric and the magnitude of the difference. In case of revenue as the target metric, if a predicted value is greater than an actual value, then there is a potential issue with the computer system. If the predicted value equals or is very similar to the actual value, then any changes can be explained by market forces. If the predicted value is less than the actual value, then there is a potential issue with the training data, such as not enough training data or not enough of the right kind of training data. In the case of CTR, any discrepancy between an actual value and a corresponding predicted value is considered "bad" and a possible indicator of computer system problems.

Examples of computer system problems include dropping requests (which would affect at least revenue) that are directed to a certain data center (e.g., of multiple data centers) or that originate from a certain part of the world, incorrectly categorizing (or recognizing) certain types of computing devices (e.g., not recognizing mobile devices), downstream services at the computer system becoming unavailable or unreachable, stale data due to failure of offline processing, degradation of a ranking algorithm (e.g., in the case of advertisements), degradation of network connectivity, an ad rendering issue, a data tracking issue (e.g., where clicks are performed but not tracked, resulting in a lower CTR), a UI tapping issue (where a user taps a content item but is not recognized as a click, resulting in a lower CTR), a relevance model missing issue, a latency issue, and a UI issue.

Without techniques described herein, it would be difficult to tell whether current performance (as reflected in, for example, actual CTR) of a computer system is expected or likely due to a problem with the computer system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
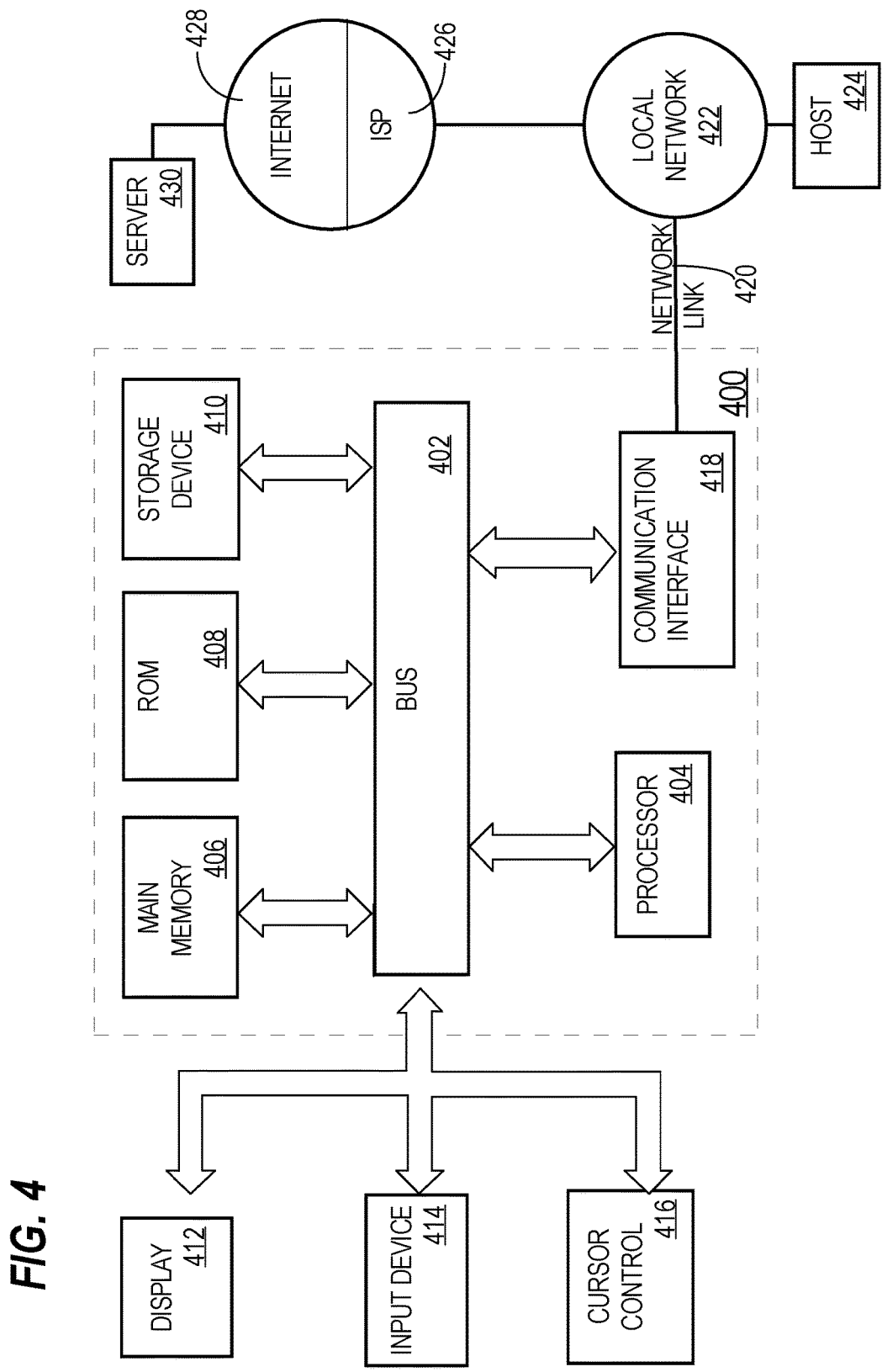
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying a plurality of data sets, wherein each data set in the plurality of data sets includes multiple values indicating a set of attributes that relate to a computer system and that correspond to a different time period of a plurality of time periods;
    generating a statistical model based on the plurality of data sets;
    identifying a particular data set that includes a set of values that indicate the set of attributes and that correspond to a particular time period that is subsequent to each time period of the plurality of time periods;
    using the statistical model to generate, based on the particular data set, a predicted value;
    identifying an actual value that corresponds to the particular time period;
    calculating a difference between the actual value and the predicted value, wherein the difference indicates a likelihood that the computer system is experiencing a problem;
    causing the difference between the actual value and the predicted value to be displayed on a screen of a computing device;
    for each value in the set of values of the particular data set, determining a measure of influence that said each value had on the predicted value;
    based on the measure of influence of each value in the set of values, creating an ordered set of attributes that indicates attributes, in the set of attributes, that have the highest measure of influence on the predicted value;
    causing the ordered set of attributes to be displayed on the screen of the computing device;
    wherein the method is performed by one or more computing devices.

2. The method of claim 1, wherein the statistical model is a first statistical model, the method further comprising:
    identifying a second plurality of data sets, wherein each data set in the second plurality of data sets includes multiple values indicating the set of attributes that relate to the computer system and that correspond to a different time period of a second plurality of time periods;
    generating, based on the second plurality of data sets, a second statistical model that is different than the first statistical model;
    identifying a second particular data set that includes a second set of values that indicate the set of attributes and that correspond to a second particular time period that is subsequent to each time period of the second plurality of time periods;
    using the second statistical model to generate, based on the second particular data set, a second predicted value;
    identifying a second actual value that corresponds to the second particular time period;
    calculating a second difference between the second actual value and the second predicted value, wherein the second difference indicates a second likelihood that the computer system is experiencing a problem;
    causing the second difference between the second actual value and the second predicted value to be displayed on the screen of the computing device.

3. The method of claim 2, further comprising:
    causing a graph to be displayed on the screen of the computing device;
    wherein the graph includes a first line that connects, on the graph, a first point that corresponds to the actual value to a second point that corresponds to the second actual value;
    wherein the graph includes a second line that connects, on the graph, a third point that corresponds to the predicted value to a fourth point that corresponds to the second predicted value.

4. The method of claim 2, further comprising:
    calculating a first error measurement based on the difference between the actual value and the predicted value;
    calculating a second error measurement based on the second difference between the second actual value and the second predicted value;
    calculating an error rate based on the first error measurement and the second error measurement.

5. The method of claim 1, wherein:
    the predicted value is a prediction of a rate of user interaction with respect to web content, a cost per user interaction with respect to web content, or an amount a content distributor earns from delivering content items of multiple content distribution campaigns.

6. The method of claim 5, further comprising:
    for each value in the set of values of the particular data set, determining a measure of influence that said each value had on the predicted value;
    based on the measure of influence of each value in the set of values, ordering the set of attributes to create an ordered set of attributes;
    causing the ordered set of attributes to be displayed on the screen of the computing device.

7. The method of claim 5, wherein the predicted value is a prediction of the rate of user interaction with respect to web content or the cost per user interaction with respect to web content.

8. The method of claim 1, further comprising:
receiving, from the computing device, a request to generate a prediction;
wherein generating the statistical model and causing the difference to be displayed is performed in response to receiving the request.

9. The method of claim 1, wherein the statistical model is a first statistical model, the predicted value is a first predicted value of a first type, the method further comprising, after causing the difference to be displayed:
receiving user input that selects a second type of predicted value that is different than the first type:
in response to receiving the user input:
identifying a second plurality of data sets, wherein each data set in the second plurality of data sets includes multiple values indicating a second set of attributes that relate to the computer system and that correspond to a different time period of the plurality of time periods;
generating, based on the second plurality of data sets, a second statistical model that is different than the first statistical model;
identifying a second data set that includes a second set of values that indicate the second set of attributes and that correspond to the particular time period that is subsequent to each time period of the plurality of time periods;
using the second statistical model to generate, based on the second data set, a second predicted value of the second type;
identifying a second actual value that is of the second type and that corresponds to the particular time period;
calculating a second difference between the second actual value and the second predicted value, wherein the second difference indicates a second likelihood that the computer system is experiencing a problem;
causing the second difference between the second actual value and the second predicted value to be displayed on the screen of the computing device.

10. The method of claim 1, further comprising:
storing a plurality of user profiles;
determining, for each time period of the plurality of time periods, a number of requests that the computer system received during said each time period and that were initiated by users who share a particular characteristic indicated in a subset of the plurality of user profiles;
wherein an attribute in the set of attributes includes the number of requests.

11. The method of claim 1, wherein a measure of influence of an attribute is based on (1) an importance of the attribute to the statistical model and (2) an importance of the attribute during the particular time period, wherein an importance of the attribute during the particular time period is based on an actual attribute value during the particular time period and an aggregated attribute value over a time period that is different than the particular time period.

12. A method comprising:
identifying a plurality of data sets, wherein each data set in the plurality of data sets includes multiple values indicating a set of attributes that relate to a computer system and that correspond to a different time period of a plurality of time periods;
generating a statistical model based on the plurality of data sets;
identifying a particular data set that includes a set of values that indicate the set of attributes and that correspond to a particular time period that is subsequent to each time period of the plurality of time periods;
using the statistical model to generate, based on the particular data set, a predicted value;
identifying an actual value that corresponds to the particular time period;
calculating a difference between the actual value and the predicted value, wherein the difference indicates a likelihood that the computer system is experiencing a problem;
causing the difference between the actual value and the predicted value to be displayed on a screen of a computing device;
wherein the statistical model is a first statistical model and the set of attributes is a first set of attributes upon which the first statistical model is generated;
after causing the difference to be displayed:
receiving user input that selects a second set of attributes that is different than the first set of attributes:
in response to receiving the user input, identifying a second plurality of data sets, wherein each data set in the second plurality of data sets includes multiple values indicating the second set of attributes that relate to the computer system and that correspond to a different time period of the plurality of time periods;
generating, based on the second plurality of data sets, a second statistical model that is different than the first statistical model;
identifying a second data set that includes a second set of values that indicate the second set of attributes and that correspond to the particular time period that is subsequent to each time period of the plurality of time periods;
using the second statistical model to generate, based on the second data set, a second predicted value;
identifying the actual value that corresponds to the particular time period;
calculating a second difference between the actual value and the second predicted value, wherein the second difference indicates a second likelihood that the computer system is experiencing a problem;
causing the second difference between the actual value and the second predicted value to be displayed on the screen of the computing device;
wherein the method is performed by one or more computing devices.

13. A system comprising:
one or more processors;
one or more storage media storing instructions which, when executed by the one or more processors, further cause:
identifying a plurality of data sets, wherein each data set in the plurality of data sets includes multiple values indicating a set of attributes that relate to a computer system and that correspond to a different time period of a plurality of time periods;
generating a statistical model based on the plurality of data sets;
identifying a particular data set that includes a set of values that indicate the set of attributes and that correspond to a particular time period that is subsequent to each time period of the plurality of time periods;
using the statistical model to generate, based on the particular data set, a predicted value;
identifying an actual value that corresponds to the particular time period;
calculating a difference between the actual value and the predicted value, wherein the difference indicates a likelihood that the computer system is experiencing a problem;
causing the difference between the actual value and the predicted value to be displayed on a screen of a computing device;
storing a plurality of user profiles;
determining, for each time period of the plurality of time periods, a number of requests that the computer system received during said each time period and that were initiated by users who share a particular characteristic indicated in a subset of the plurality of user profiles;
wherein an attribute in the set of attributes includes the number of requests.

14. The system of claim 13, wherein the predicted value is based on the particular data set, wherein the instructions, when executed by the one or more processors, further cause:
for each value in the set of values of the particular data set, determining a measure of influence that said each value had on, the predicted value;
based on the measure of influence of each value in the set of values, ordering the set of attributes to create an ordered set of attributes;
causing the ordered set of attributes to be displayed on the screen of the computing device.

15. The system of claim 13, wherein the statistical model is a first statistical model, wherein the instructions, when executed by the one or more processors, further cause:
identifying a second plurality of data sets, wherein each data set in the second plurality of data sets includes multiple values indicating the set of attributes that relate to the computer system and that correspond to a different time period of a second plurality of time periods;
generating, based on the second plurality of data sets, a second statistical model that is different than the first statistical model;
identifying a second particular data set that includes a second set of values that indicate the set of attributes and that correspond to a second particular time period that is subsequent to each time period of the second plurality of time periods;
using the second statistical model to generate, based on the second particular data set, a second predicted value;
identifying a second actual value that corresponds to the second particular time period;
calculating a second difference between the second actual value and the second predicted value, wherein the second difference indicates a second likelihood that the computer system is experiencing a problem;
causing the second difference between the second actual value and the second predicted value to be displayed on the screen of the computing device.

16. The system of claim 15, wherein:
the instructions, when executed by the one or more processors, further cause causing a graph to be displayed on the screen of the computing device;
the graph includes a first line that connects, on the graph, a first point that corresponds to the actual value to a second point that corresponds to the second actual value;
the graph includes a second line that connects, on the graph, a third point that corresponds to the predicted value to a fourth point that corresponds to the second predicted value.

17. The system of claim 15, wherein the instructions, when executed by the one or more processors, further cause:
calculating a first error measurement based on the difference between the actual value and the predicted value;
calculating a second error measurement based on the second difference between the second actual value and the second predicted value;
calculating an error rate based on the first error measurement and the second error measurement.

18. The system of claim 13, wherein the predicted value is a prediction of a rate of user interaction with respect to web content.

19. The system of claim 13, wherein:
the instructions, when executed by the one or more processors, further cause receiving, from the computing device, a request to generate a prediction;
generating the statistical model and causing the difference to be displayed is performed in response to receiving the request.

20. The system of claim 13, wherein the statistical model is a first statistical model and the set of attributes is a first set of attributes upon which the first statistical model is generated, wherein the instructions, when executed by the one or more processors, further cause, after causing the difference to be displayed:
receiving user input that selects a second set of attributes that is different than the first set of attributes:
in response to receiving the user input, identifying a second plurality of data sets, wherein each data set in the second plurality of data sets includes multiple values indicating the second set of attributes that relate to the computer system and that correspond to a different time period of the plurality of time periods;
generating, based on the second plurality of data sets, a second statistical model that is different than the first statistical model;
identifying a second data set that includes a second set of values that indicate the second set of attributes and that correspond to the particular time period that is subsequent to each time period of the plurality of time periods;
using the second statistical model to generate, based on the second data set, a second predicted value;
identifying the actual value that corresponds to the particular time period;
calculating a second difference between the actual value and the second predicted value, wherein the second difference indicates a second likelihood that the computer system is experiencing a problem;
causing the second difference between the actual value and the second predicted value to be displayed on the screen of the computing device.

21. The system of claim 13, wherein the statistical model is a first statistical model, the predicted value is a first predicted value of a first type, wherein the instructions, when executed by the one or more processors, further cause, after causing the difference to be displayed:
receiving user input that selects a second type of predicted value that is different than the first type:

in response to receiving the user input:
- identifying a second plurality of data sets, wherein each data set in the second plurality of data sets includes multiple values indicating a second set of attributes that relate to the computer system and that correspond to a different time period of the plurality of time periods;
- generating, based on the second plurality of data sets, a second statistical model that is different than the first statistical model;
- identifying a second data set that includes a second set of values that indicate the second set of attributes and that correspond to the particular time period that is subsequent to each time period of the plurality of time periods;
- using the second statistical model to generate, based on the second data set, a second predicted value of the second type;
- identifying a second actual value that is of the second type and that corresponds to the particular time period;
- calculating a second difference between the second actual value and the second predicted value, wherein the second difference indicates a second likelihood that the computer system is experiencing a problem;
- causing the second difference between the second actual value and the second predicted value to be displayed on the screen of the computing device.

* * * * *